April 11, 1967   F. BIEDERMANN   3,313,224
AUTOMATIC APERTURE CONTROL FOR PHOTOGRAPHIC CAMERAS
Filed May 11, 1964
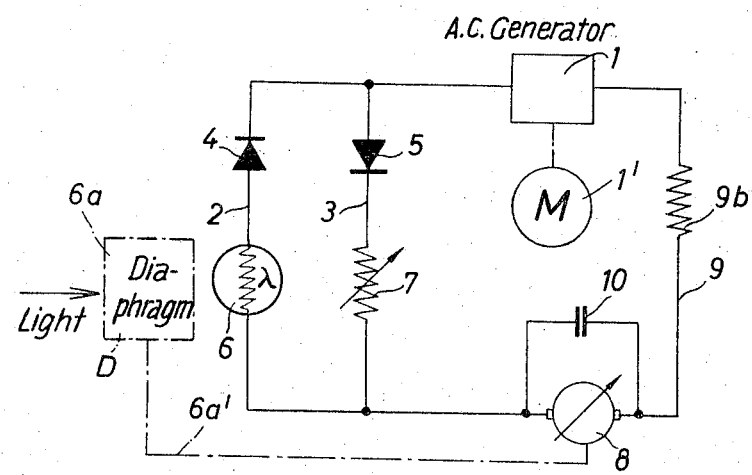
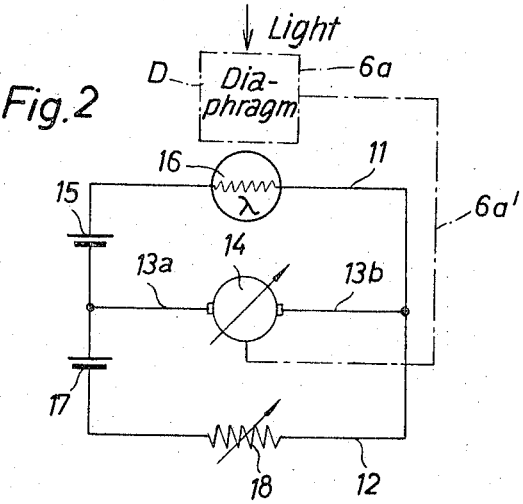
INVENTOR.
FRIEDRICH BIEDERMANN
BY
Michael S. Striker
Attorney

United States Patent Office

3,313,224
Patented Apr. 11, 1967

3,313,224
AUTOMATIC APERTURE CONTROL FOR
PHOTOGRAPHIC CAMERAS
Friedrich Biedermann, Unterhaching, Munich, Germany, assignor to Agfa Aktiengesellschaft, Leverkusen, Germany
Filed May 11, 1964, Ser. No. 366,294
Claims priority, application Germany, June 1, 1963, A 43,245
6 Claims. (Cl. 95—64)

The present invention concerns an automatic aperture control for photographic cameras having an adjustable aperture diaphragm, particularly for cinematographic cameras.

In control arrangements of this type the adjustable aperture diaphragm is usually controlled and adjusted by the action of an electromotive device which, in turn, is actuated by a current controlled by a photo-responsive resistance impinged upon by light passing through the adjustable aperture.

Wherever in the prior art a so-called moving coil instrument has been used as an electromotive device for the above specified purpose such moving coil instrument had to be provided with two separate and independent coils each being connected in a separate circuit. Consequently, special types of moving-coil instruments had to be used whereby the cost of the arrangement was considerably increased.

It is one object of this invention to provide for an automatic aperture control arrangement of the above defined class which however is so constructed that a normal and standard electromotive device, e.g., a moving-coil instrument having only one single coil can be used for actuating or controlling the adjustable aperture diaphragm.

It is a further object of this invention to provide an arrangement of this kind which is comparatively simple in construction and can be manufactured at comparatively low cost.

It is still another object of this invention to provide for an arrangement as set forth which in one modification can be operated with direct current from a battery or storage battery and in another embodiment can be operated with direct current derived from a source of alternating current.

With above objects in view the invention includes in a photographic camera having an adjustable aperture diaphragm, an automatic aperture control, comprising, in combination, photo-responsive resistance means located for being exposed to at least a predetermined fraction of the light passing through the diaphragm aperture; ohmic resistance means of predetermined resistance; electric energy source means; electromotive means for producing a torque and for applying such torque to the adjustable diaphragm for adjusting the latter, said torque corresponding in magnitude and direction to the magnitude and direction of electric current flow acting on said electromotive means; and circuit means connecting said source means, said photo-responsive resistance means, said ohmic resistance means and said electromotive means with each other in such a manner that a first current from said source means flows through said photo-responsive resistance means and said electromotive means in one direction and with an intensity depending on the amount of light passing through said aperture and impinging on said photo-responsive resistance means, and that a second current flows simultaneously through said ohmic resistance means and said electromotive means in the opposite direction and with an intensity depending upon the resistance of said ohmic resistance means, so that the adjustment of said aperture corresponds to a current determined by the difference between said first and second currents flowing in opposite directions through said electromotive means.

The novel features which are considered as characteristic for the invention are set forth in particular in the appended claims. The invention itself, however, both as to its construction and its method of operation, together with additional objects and advantages thereof, will be best understood from the following descriptions of specific embodiments when read in connection with the accompanying drawing in which:

FIG. 1 is a schematic circuit diagram illustrating an embodiment of the invention in which the primary source of electric energy furnishes alternating current voltage; and FIG. 2 is a schematic circuit diagram of another embodiment of the invention in which the source of electric energy furnishes direct current voltage.

The embodiment according to FIG. 1 includes an alternating current generator 1, which may be a rotary generator of alternating voltage driven by the motor 1' which is contained in a cinematographic camera for effecting the film transport. However, the alternating current generator may be of any other suitable type, particularly if the camera is not a cinematographic camera, in which case the alternating current voltage may be produced by a transistor-type alternator energized from a source of direct current. The optical components of the camera are not illustrated in the drawing because they do not constitute part of the present invention. However FIG. 1 shows schematically the location of an adjustable aperture diaphragm 6a in the path of light and a photo-responsive resistor 6 so arranged that at least a predetermined fraction of light passing through the aperture of the diaphragm will impinge upon this resistor 6. The adjustable diaphragm 6a is operatively connected as indicated by the dash-dotted line 6a' with an electromotive device, e.g., a moving-coil instrument 8. This instrument has only one coil which is connected in an operating circuit as will be described below. Preferably the moving-coil instrument 8 is of that type which is not provided with any biasing means like a string which tends to urge the coil toward a predetermined normal position. Thus, the moving coil of the instrument 8 will always assume a position which only depends upon the direction and magnitude or intensity of a current passing through that coil. Accordingly a torque is transmitted from the instrument 8 to the adjustable diaphragm so as to effect the desired and corresponding adjustment of the latter. The circuit connecting the terminals of the alternating current generator 1 with the terminals of the moving-coil instrument 8 comprises two branches. The first branch contains in addition to the terminals of the source 1 and the moving-coil instrument 8 the above mentioned photo-responsive resistor 6 and a rectifier 4 whereby the direction of the rectified current flow through the instrument 8 is determined. A second branch of the circuit includes in addition to the terminals of the source 1 and the instrument 8 a second rectifier 5 which determines a current flow in opposite direction through the instrument 8 and through a preferably variable ohmic resistor 7.

As soon as electric energy is applied to the above described circuit, or, in the specific case of a cinematographic camera, the operation of the camera is started and thus the camera motor 1' has started driving the alternating current generator 1, or as soon as some other source of alternating current voltage is started to operate, a first current of predetermined direction will flow through the instrument 8 and through the photo-responsive resistor 6 while simultaneously a second current is caused to flow through the instrument 8 in opposite direction with an intensity depending upon the setting of the variable resistor 7. The first and second currents mentioned above are pulsating direct currents. Therefore preferably a capacitor 10 is connected in parallel with coil of the instrument 8.

It will be understood that under the circumstances pulsating rectified currents flow in opposite directions through the branches 2 and 3 of the circuit and simultaneously through the coil of the instrument 8 and through the return line 9. The magnitude and direction of the pulsating current, smoothened to a greater or lesser degree by the capacitor 10 depending upon the magnitude of the latter, is defined by the difference of the pulsating rectified currents of opposite direction. The resulting current acting on the coil of the instrument 8 flows in one or the opposite direction depending upon which one of the first and second currents flowing through the branches 2 and 3, respectively, is the larger one. Depending upon intensity and direction of the resulting current the moving coil of the instrument 8 will turn in one or the other sense through a corresponding angle and thereby effects a corresponding change of the adjustable aperture of the diaphragm 6a. However, as the size of the aperture changes the amount of light impinging on the photo-responsive resistor 6 changes and causes a corresponding change of the resistance thereof. Consequently, the turning movement of the moving coil of the instrument 8 and accordingly the simultaneous adjustment of the aperture size continues until the currents flowing in opposite direction through the branches 2 and 3 have equal value so that the resulting current acting on the coil of the instrument 8 is reduced to the value zero.

The capacitor 10 mentioned above serves to smoothen the pulsating rectified current and to suppress otherwise possible pulsating movements of the moving coil of the instrument 8. It is not necessary to provide for a stabilization of the absolute value of the voltage across the instrument 8 because it is evident that the arrangement as described as illustrated operates without being dependent on a particular voltage value.

It can be seen that an additional advantage of this arrangement is due to the fact that there is no necessity to provide for special batteries or the like for the operation of the aperture control arrangement and to carry such batteries along and to maintain the latter. This is avoided particularly if an alternating current generator 1 is driven by the camera motor of a cinematographic camera. It is even possible that a cinematographic camera is operated with the aid of a spring motor so that in this case the entire arrangement would be free of any need for a battery or any other supply of electric energy from the outside.

The arrangement according to FIG. 2 is generally similar to that of FIG. 1 except that in this case the source of electric energy is a supply of direct current. The arrangement comprises again a photo-responsive resistor 16 exposed to light passing through the adjustable aperture diaphragm 6a which is adjustable by being operatively connected as indicated at 6a' with an electromotive device, e.g., a moving-coil instrument 14. This instrument has only one coil connected between the portions 13a and 13b of the circuit arrangement. Also in this case the coil of the instrument 14 is not provided with biasing means, e.g., springs for returning the coil always to a predetermined zero position. The circuit arrangement comprises two branches 11 and 12. In the first branch 11 is located a battery 15 and the photo-responsive resistor 16, the battery 15 being so poled that direct current will flow in one predetermined direction through the circuit portion 11 and through the instrument 14. The second branch 12 contains a second battery 17 and an ohmic resistor 18, preferably adjustable, the battery 17 being so poled that a current flowing through the branch 12 and through the coil of the instrument 14 has a direction opposite to the current from the battery 15. Consequently, this arrangement will operate exactly in the same manner as described above as soon as electric energy from the batteries 15 and 17 is released into the circuit, e.g., by closing of a switch not shown in FIG. 2.

It is evident that the batteries 15 and 17 may be either of the nature of dry batteries or storage batteries of small size, or any other source of direct current voltage.

The circuit arrangement according to the invention may comprise also a calibrating resistor 9b as shown in FIG. 1.

It is highly advisable to use as ohmic resistances variable resistors 7 and 18, respectively because by adjusting these resistances certain factors important for obtaining the correct exposure may be taken into consideration, e.g., the sensitivity of the film material used in the camera or the number of frames per second to be produced in the operation of a cinematographic camera.

It will be understood that each of the elements described above, or two or more together, may also find a useful application in other types of an automatic aperture control for a photographic camera differing from the types described above.

While the invention has been illustrated and described as embodied in an automatic aperture control for a photographic camera having an adjustable aperture diaphragm, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic camera having an adjustable aperture diaphragm, an automatic aperture control, comprising, in combination, photo-responsive resistance means located for being exposed to at least a predetermined fraction of the light passing through the diaphragm aperture; ohmic resistance means of predetermined resistance; electric energy source means furnishing alternating voltage; moving-coil instrument means for producing a torque and for applying such torque to the adjustable diaphragm for adjusting the latter, said torque corresponding in magnitude and direction to the magnitude and direction of electric current flow acting on said moving-coil instrument means; and circuit means including two branches respectively connecting said source means, said photo-responsive resistance means, said ohmic resistance means and said moving-coil instrument means with each other, one of said branches containing the terminals of said source means, said photo-responsive resistance means, said moving-coil instrument means and a first rectifier means so poled that a first current from said source means flows through said one of said branches containing said photo-responsive resistance means and said moving-coil instrument means in one direction and with an intensity depending on the amount of light passing through said aperture and impinging on said photo-responsive resistance means, and the other one of said source means, said ohmic resistance means, said moving-coil instrument means and a second rectifier means so poled that from said source means a second current flows simultaneously through said other one of said branches containing said ohmic resistance means and said moving-coil instrument means in the opposite direction and with an intensity depending upon the resistance of said ohmic resistance means, so that the amplitude of the adjustment of said aperture corresponds to a current determined by the difference between said first and second currents flowing in opposite directions through said circuit branches and said moving-coil instrument means.

2. In a cinematographic camera having an adjustable aperture diaphragm, an automatic aperture control and camera drive motor, comprising, in combination, photo-responsive resistance means located for being exposed to at least a predetermined fraction of the light passing through the diaphragm aperture; ohmic resistance means of predetermined resistance; electric energy generator means furnishing alternating voltage and operatively connected with the camera drive motor for being driven thereby; moving-coil instrument means for producing a torque and for applying such torque to the adjustable diaphragm for adjusting the latter, said torque corresponding in magnitude and direction to the magnitude and direction of electric current flow acting on said moving-coil instrument means; and circuit means including two branches respectively connecting said source means, said photo-responsive resistance means, said ohmic resistance means and said moving-coil instrument means with each other, one of said branches containing the terminals of said source means, said photo-responsive resistance means, said moving-coil instrument means and a first rectifier means so poled that a first current from said source means flows through said one of said branches containing said photo-responsive resistance means and said moving-coil instrument means in one direction and with an intensity depending on the amount of light passing through said aperture and impinging on said photo-responsive resistance means, and the other one of said source means, said ohmic resistance means, said moving-coil instrument means and a second rectifier means so poled that from said source means a second current flows simultaneously through said other one of said branches containing said ohmic resistance means and said moving-coil instrument means in the opposite direction and with an intensity depending upon the resistance of said ohmic resistance means, so that the amplitude of the adjustment of said aperture corresponds to a current determined by the difference between said first and second currents flowing in opposite directions through said circuit branches and said moving-coil instrument means.

3. In a photographic camera having an adjustable aperture diaphragm, an automatic aperture control, comprising, in combination, photo-responsive resistance means located for being exposed to at least a predetermined fraction of the light passing through the diaphragm aperture; ohmic resistance means of variable resistance for permitting adjustment of the aperture control in consideration of factors influencing the required exposure; electric energy source means furnishing alternating voltage; moving-coil instrument means for producing a torque and for applying such torque to the adjustable diaphragm for adjusting the latter, said torque corresponding in magnitude and direction to the magnitude and direction of electric current flow acting on said moving-coil instrument means; and circuit means including two branches respectively connecting said source means, said photo-responsive resistance means, said ohmic resistance means and said moving-coil instrument means with each other, one of said branches containing the terminals of said source means, said photo-responsive resistance means, said moving-coil instrument means and a first rectifier means so poled that a first current from said source means flows through said one of said branches containing said photo-responsive resistance means and said moving-coil instrument means in one direction and with an intensity depending on the amount of light passing through said aperture and impinging on said photo-responsive resistance means, and the other one of said source means, said ohmic resistance means, said moving-coil instrument means and a second rectifier means so poled that from said source means a second current flows simultaneously through said other one of said branches containing said ohmic resistance means and said moving-coil instrument means in the opposite direction and with an intensity depending upon the resistance of said ohmic resistance means, so that the amplitude of the adjustment of said aperture corresponds to a current determined by the difference between said first and second currents flowing in opposite directions through said circuit branches and said moving-coil instrument means.

4. In a cinematographic camera having an adjustable aperture diaphragm, an automatic aperture control and a camera drive motor, comprising, in combination, photo-responsive resistance means located for being exposed to at least a predetermined fraction of the light passing through the diaphragm aperture; ohmic resistance means of variable resistance for permitting adjustment of the aperture control in consideration of factors influencing the required exposure; electric energy generator means furnishing alternating voltage and operatively connected with the camera drive motor for being driven thereby; moving-coil instrument means for producing a torque and for applying such torque to the adjustable diaphragm for adjusting the latter, said torque corresponding in magnitude and direction to the magnitude and direction of electric current flow acting on said moving-coil instrument means; and circuit means including two branches respectively connecting said source means, said photo-responsive resistance means, said ohmic resistance means and said moving-coil instrument means with each other, one of said branches containing the terminals of said source means, said photo-responsive resistance means, said moving-coil instrument means and a first rectifier means so poled that a first current from said source means flows through said one of said branches containing said photo-responsive resistance means and said moving-coil instrument means in one direction and with an intensity depending on the amount of light passing through said aperture and impinging on said photo-responsive resistance means, and the other one of said source means, said ohmic resistance means, said moving-coil instrument means and a second rectifier means so poled that from said source means a second current flows simultaneously through said other one of said branches containing said ohmic resistance means and said moving-coil instrument means in the opposite direction and with an intensity depending upon the resistance of said ohmic resistance means, so that the amplitude of the adjustment of said aperture corresponds to a current determined by the difference between said first and second currents flowing in opposite directions through said circuit branches and said moving-coil instrument means.

5. In a photographic camera having an adjustable aperture diaphragm, an automatic aperture control, comprising, in combination, photo-responsive resistance means located for being exposed to at least a predetermined fraction of the light passing through the diaphragm aperture; ohmic resistance means of predetermined resistance; electric energy source means furnishing alternating voltage; moving-coil instrument means including a single coil and a capacitor connected in parallel therewith for producing a torque and for applying such torque to the adjustable diaphragm for adjusting the latter, said torque corresponding in magnitude and direction to the magnitude and direction of electric current flow acting on said moving-coil instrument means; and circuit means including two branches respectively connecting said source means, said photo-responsive resistance means, said ohmic resistance means and said moving-coil instrument means with each other, one of said branches containing the terminals of said source means, said photo-responsive resistance means, said moving-coil instrument means and a first rectifier means so poled that a first current from said source means flows through said one of said branches containing said photo-responsive resistance means and said moving-coil instrument means in one direction and with an intensity depending on the amount of light passing through said aperture and impinging on said photo-responsive resistance means, and the other one of said source means, said ohmic resistance means, said moving-coil instrument means and a second rectifier means so poled that from said source means a second current flows simultaneously through said other one of said branches containing said ohmic resistance means and said moving-coil instrument means in the opposite direction and with an intensity depending upon the resistance of said ohmic resistance means, so that the amplitude of the adjustment of said aperture corresponds to a current determined by the difference between said first and second currents flowing in opposite directions through said circuit branches and said moving-coil instrument means.

6. In a cinematographic camera having an adjustable aperture diaphragm, an automatic aperture control and a camera drive motor, comprising, in combination, photo-responsive resistance means located for being exposed to at least a predetermined fraction of the light passing through the diaphragm aperture; ohmic resistance means of predetermined resistance; electric energy generator means furnishing alternating voltage and operatively connected with the camera drive motor for being driven thereby; moving-coil instrument means including a single coil and a capacitor connected in parallel therewith for producing a torque and for applying such torque to the adjustable diaphragm for adjusting the latter, said torque corresponding in magnitude and direction to the magnitude and direction of electric current flow acting on said moving-coil instrument means; and circuit means including two branches respectively connecting said source means, said photo-responsive resistance means, said ohmic resistance means and said moving-coil instrument means with each other, one of said branches containing the terminals of said source means, said photo-responsive resistance means, said moving-coil instrument means and a first rectifier means so poled that a first current from said source means flows through said one of said branches containing said photo-responsive resistance means and said moving-coil instrument means in one direction and with an intensity depending on the amount of light passing through said aperture and impinging on said photo-responsive resistance means, and the other one of said source means, said ohmic resistance means, said moving-coil instrument means and a second rectifier means so poled that from said source means a second current flows simultaneously through said other one of said branches containing said ohmic resistance means and said moving-coil instrument means in the opposite direction and with an intensity depending upon the resistance of said ohmic resistance means, so that the amplitude of the adjustment of said aperture corresponds to a current determined by the difference between said first and second currents flowing in opposite directions through said circuit branches and said moving-coil instrument means.

References Cited by the Examiner

UNITED STATES PATENTS

| 3,124,033 | 3/1964 | Freudenschuss | 95—64 X |
| 3,176,312 | 3/1965 | Reinsch | 95—64 X |
| 3,183,808 | 5/1965 | Teshi | 95—10 |

FOREIGN PATENTS

| 1,223,439 | 2/1960 | France. |

NORTON ANSHER, *Primary Examiner.*

C. B. PRICE, J. F. PETERS, *Assistant Examiners.*